Figure 1:
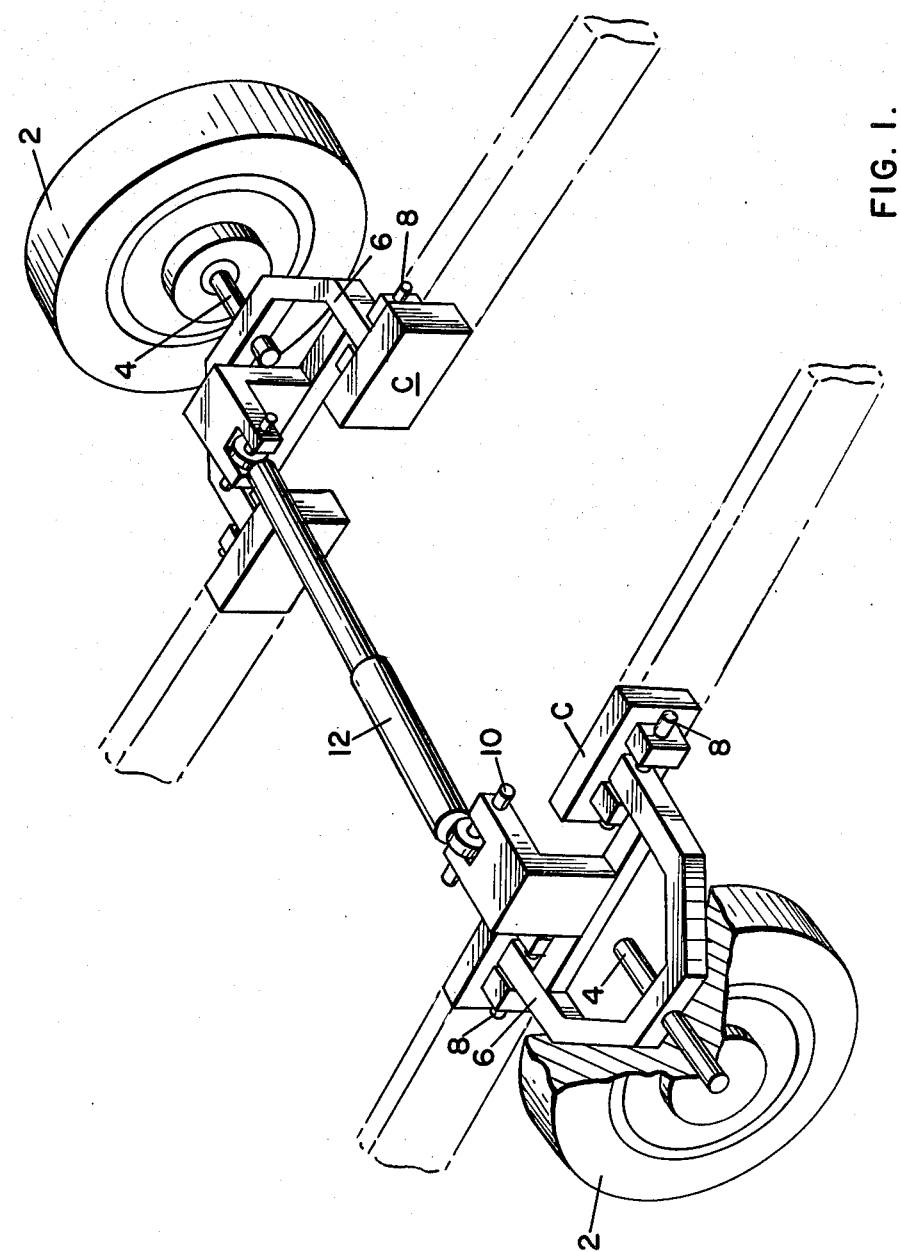

United States Patent [19]

Duphily et al.

[11] Patent Number: 4,470,611
[45] Date of Patent: Sep. 11, 1984

[54] VEHICLE WHEEL COMPENSATING/SUSPENDING SYSTEMS

[76] Inventors: Raymond G. Duphily, 34 Flat Swamp Rd., North Dartmouth, Mass. 02747; Howard J. Dawson, Jr., 9 Simpson La., Assonet, Mass. 02702

[21] Appl. No.: 415,480

[22] Filed: Sep. 7, 1982

[51] Int. Cl.³ ............................................. B62D 21/00
[52] U.S. Cl. .................................... 280/104; 280/111
[58] Field of Search ................... 280/104, 111, 112 A

[56] References Cited

U.S. PATENT DOCUMENTS

| | | | |
|---|---|---|---|
| 3,003,575 | 10/1961 | Nallinger | 280/104 |
| 3,598,385 | 8/1971 | Parsons, Jr. | 280/112 A |
| 4,003,443 | 1/1977 | Boughers | 280/104 |

FOREIGN PATENT DOCUMENTS

| | | | |
|---|---|---|---|
| 521414 | 3/1955 | Italy | 280/104 |
| 186452 | 10/1922 | United Kingdom | 280/104 |
| 634111 | 3/1950 | United Kingdom | 280/104 |

Primary Examiner—Joseph F. Peters, Jr.
Assistant Examiner—Kenneth R. Rice
Attorney, Agent, or Firm—Ross, Ross & Flavin

[57] ABSTRACT

The vehicle suspension system embodies a vehicle chassis, a pair of opposed axle-mounted wheels mounted to a U-shaped member which is pivoted to the chassis for allowing interdependent vertical wheel deflection relative to the chassis, and a pair of opposed link members. Each link member is pivotally connected to a U-shaped member and also pivotally connected to a respective toggle. A damping means is extendable transversely across and upwardly of the chassis and is pivotally engageable at each of its termini with a respective adjacent toggle. Any deflection in one of the wheels generating a stress in the damping means transmits a compensating reaction on the opposite wheel through its associated link member.

2 Claims, 3 Drawing Figures

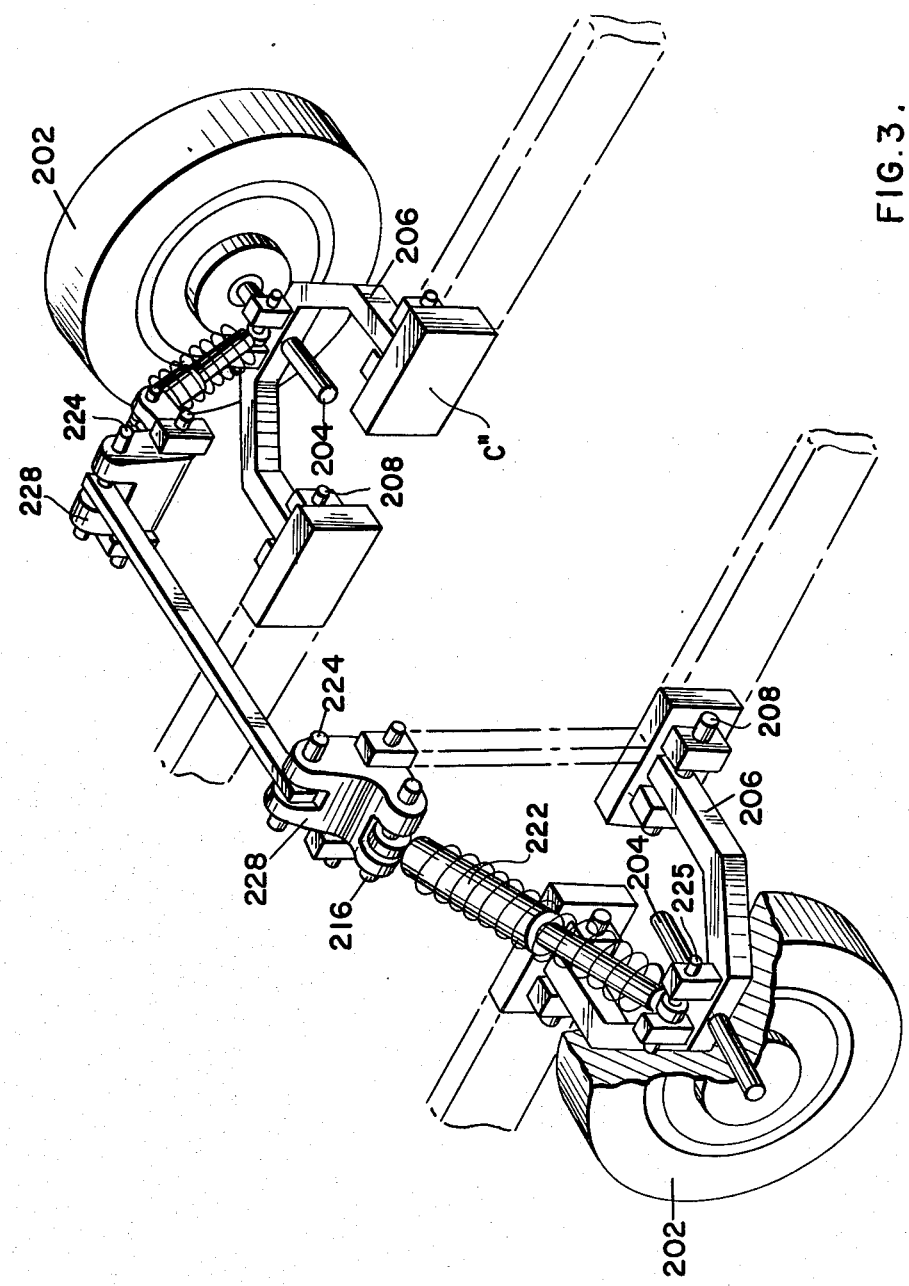

VEHICLE WHEEL COMPENSATING/SUSPENDING SYSTEMS

This invention relates to vehicle wheel compensating/suspending systems and has, as its primary purpose, to teach means for disassociating the shock absorbing and springing action between opposing wheels from the chassis. That is, means whereby road and tire excitations of each of the opposed wheels and axles therefor are isolated from the chassis. The wheel axles are mounted on members which are movable relative to the chassis in manner such as to allow vertical wheel movements and an articulated load equalizing device or similar elastomeric springing mechanism interconnects therebetween and is subjected to the load on one of the wheels which in turn is directed as a force against the other wheel.

The invention, broadly speaking, envisions a vehicle suspension system which includes a vehicle chassis, a pair of opposed axle-mounted wheels which are mounted relative to the chassis for allowing interdependent vertical wheel deflection relative to the chassis, a pair of opposed link members each of which is pivotally connected to a side of the chassis, and a damping means which is extendable transversely across and upwardly of the chassis and is pivotally engageable at each of its termini with a respective adjacent link member. Any vertical deflection in one of the wheels generating a stress in the damping means transmits a compensating reaction on the opposite wheel through its associated link member.

The concept envisions the linking together of a pair of opposed wheels with a springing damping device disposed as an interconnecting component therebetween. That is, the springing damping mechanism is so interposed between the wheels that a floating action is attained with the shock cushioning function being transferred from wheel to wheel. That is to say, the vertical movement of one wheel is transmitted as a force to the other wheel via a horizontal compression or movement of the springing damping mechanism rather than being transmitted from the wheel to the chassis.

The invention relates particularly to compensating-/suspending devices arranged so that vertical movements of one wheel, due to unevenness encountered in the roadway, will be compensated for, or balanced, as it were, by an application of a force upon the opposed wheel in opposite direction, thereby maintaining the body at a substantially constant distance above the roadway and avoiding in large measure the usual shocks and jolts experienced by vehicle occupants.

The forces which are exerted upon the vehicle wheels are transmitted by mechanical or hydraulic devices through a central resilient compensating unit which is provided with means which are subjected to the load of a fluid or gas or of a spring under high initial pressure.

In essence, the suspension function can be broken down into two coexisting components of motion, which components conceivably may be operational simultaneously. The first component is identified as the springing-damping component, represented by the expanding or compressing activity ensuing in conjunction with the physical movement of the springing damping device per se and it serves to control the oscillations of the spring or elastic means being employed. The second component is identified as the compensating component, represented by the physical movement of the springing damping device irrespective of any expanding or compressing activity therewithin.

Figure 2:
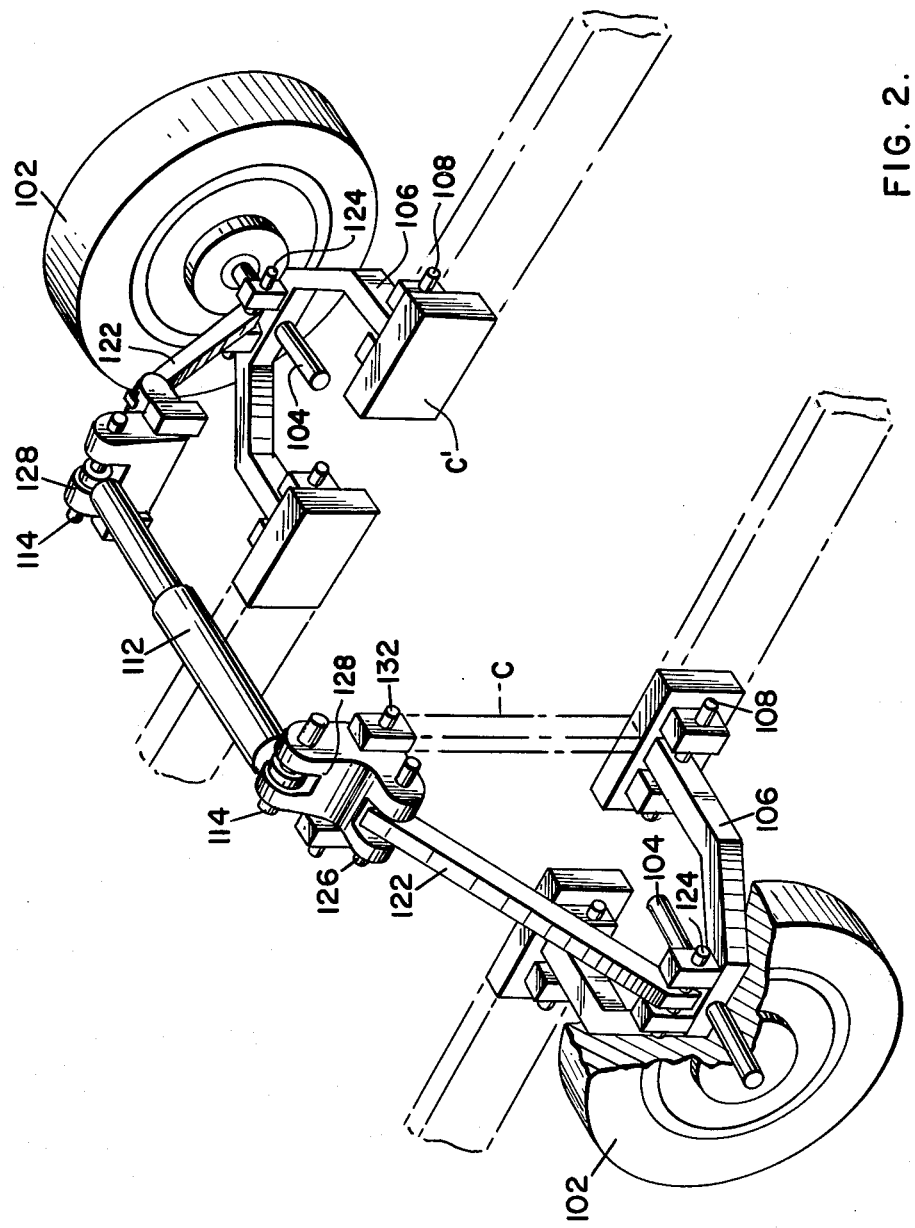

Objects relating to details of the invention will appear from the description to follow and various embodiments are illustrated in the accompanying drawings, in which:

FIG. 1 is a fragmentary isometric view illustrating the basic system of the invention; and FIGS. 2 and 3 are fragmentary isometric views illustrating first and second adaptations respectively of the basic system.

Throughout the disclosure, it will be helpful to bear in mind that the described system is adaptable to front wheels, or rear wheels, or even both front and rear wheels in the cases of four or even three wheeled vehicles where the wheels are in opposition to each other, or in the case of two wheeled vehicles, such as cycles, where the front and rear wheels may be considered as opposed.

Details of the vehicle body will be omitted in the specification and drawings for purposes of clarity and simplification.

Referring first to FIG. 1, submitted for purposes of illustrating the basic concept, we have shown a pair of opposed wheels 2, 2, say a rear set, rotatively mounted on respective stub axles 4, 4.

Conceivably, the opposed wheels could be interconnected via the usual single axle provided, of course, that each wheel was joined thereto as by a universal joint or equivalent connecting means.

The wheel compensating/springing means may comprise a member 6 which will be movable relative to the chassis represented by C, for allowing vertical wheel and axle movement, the member 6 being pivotally mounted to the chassis, for example as shown by the means of such as pivot pins 8.

Any substitute system for attaching the wheel to the chassis is acceptable provided that vertical movement of the wheel relative thereto is allowed.

Each member 6 supports in pivotal relationship by means of a pivot pin 10 a central transversely extending springing-damping device 12 in the form of a shock absorbing or other elastomeric mechanism.

When a member 6 is moved vertically in up or down direction with its wheel, there is a resultant concomitant movement, in or out, of the shock absorbing component wherefore the movement on one wheel is transferred via the springing-damping means as a force to the opposite wheel.

Thus the wheels are free to rise and fall, either unisonly or individually, in passing over road defects, the compensating mechanism acting to adjust for any variation in the relative positions of the wheels.

In the FIG. 2 modification, a pair of opposed wheels 102, 102 are each mounted on a stub axle 104.

The means for allowing wheel excitation to deflect that wheel 102 relative to the chassis C' and a compensating reaction on the opposite wheel 102 includes a pair of opposed U-shaped members 106, 106. Each is mounted centrally thereof on a respective stub axle 104 and is movable with that stub axle 104 and its supported wheel 102. Spaced opposite free ends of the U-shaped members 106 extend inwardly toward the chassis and are pivotally connected to the chassis by pins 108, 108.

A damping mechanism 112 is extendable transversely and upwardly of the chassis and has opposite termini to each of which a toggle 128 is pivotally mounted as by a pin 114. The toggle 128 is pivoted at a central point to the chassis C by a pivot pin 132.

A pair of opposed link members 122, 122 are each pivotally connected by a pin 124 to the center of a respective U-shaped member and pivotally connected by a pin 126 to the respective toggle 128.

In the FIG. 3 modification, a pair of opposed wheels 202, 202 are each mounted on a stub axle 204.

The means for allowing wheel excitation to deflect one of the wheels 202 relative to the chassis C" and a compensating reaction on the opposite wheel 202 includes a pair of opposed U-shaped members 206, 206. Each is mounted centrally thereof on a respective stub axle 204 and is movable with that stub axle 204 and its supported wheel 202. Spaced opposite free ends of the U-shaped members 206 each extend inwardly toward the chassis and are pivotally connected to the chassis by pins 208.

A connecting mechanism 211 is extendable transversely and upwardly of the chassis and has opposite termini to each of which a toggle 228 is pivotally mounted as by a pin 224.

A pair of opposed damping members 222, 222 are each pivotally connected by a pin 225 to the center of a respective U-shaped member 206 and pivotally connected by a pin 216 to the respective toggle 228.

From the foregoing description, it will be apparent that we provide compensating means for travel over uneven surfaces or in cornering, which relieves the frame, body and other rigid vehicle parts from strains and distortions.

We also provide independence between the action of the compensating device and that of the usual vehicle springing means in order that the developed spring tensions will offer no resistance to the compensating action and in order that the latter action may have no effect upon the proper functioning of the springs.

We have illustrated and described our improvements in embodiments which we have found very practical. We have not attempted to illustrate or describe other embodiments or adaptations as it is believed this disclosure will enable those skilled in the art to embody or adapt our improvements as may be desired.

We claim:

1. The combination, in a vehicle suspension system, of a vehicle chassis, a pair of opposed axle-mounted wheels mounted relative to the chassis, means for allowing deflection of one wheel relative to the chassis and a compensating reaction on the opposite wheel including, a pair of opposed U-shaped members each mounted centrally thereof on a respective stub axle and movable therewith and with its respective wheel and having spaced opposite inwardly extending free ends each pivotally connected to the chassis, and a damping mechanism extendable transversely and upwardly of the chassis and having opposite termini, and a pair of toggles each pivotally mounted on one of the termini of the damping mechanism and to the chassis, and a pair of opposed link members each pivotally connected to the center of a respective U-shaped member and pivotally connected to a respective toggle.

2. The combination, in a vehicle suspension system, of a vehicle chassis, a pair of opposed axle-mounted wheels mounted relative to the chassis, means for allowing deflection of one wheel relative to the chassis and a compensating reaction on the opposite wheel including, a pair of opposed U-shaped members each mounted centrally thereof on a respective stub axle and movable therewith and with its respective wheel and having spaced opposite inwardly extending free ends each pivotally connected to the chassis, and a connecting mechanism extendable transversely and upwardly of the chassis and having opposite termini, and a pair of toggles each pivotally mounted on one of the termini of the connecting mechanism and to the chassis, and a pair of opposed damping members each pivotally connected to the center of a respective U-shaped member and pivotally connected to a respective toggle.

* * * * *